United States Patent
Shimomura et al.

(10) Patent No.: US 9,233,644 B2
(45) Date of Patent: Jan. 12, 2016

(54) ROAD SURFACE INSPECTION DEVICE, ROAD SURFACE INSPECTION METHOD AND RECORDING MEDIUM

(71) Applicant: FUJITSU LIMITED, Kawasaki-shi (JP)

(72) Inventors: Teruo Shimomura, Oita (JP); Shin Totoki, Oita (JP); Kazuyoshi Kuzunishi, Hasuda (JP)

(73) Assignee: FUJITSU LIMITED, Kawasaki (JP)

( * ) Notice: Subject to any disclaimer, the term of this patent is extended or adjusted under 35 U.S.C. 154(b) by 486 days.

(21) Appl. No.: 13/682,366

(22) Filed: Nov. 20, 2012

(65) Prior Publication Data
US 2013/0169794 A1  Jul. 4, 2013

(30) Foreign Application Priority Data
Dec. 28, 2011  (JP) .................................. 2011-290029

(51) Int. Cl.
*B60R 1/00* (2006.01)
*G01C 7/04* (2006.01)
*E01C 23/01* (2006.01)

(52) U.S. Cl.
CPC . *B60R 1/00* (2013.01); *E01C 23/01* (2013.01); *G01C 7/04* (2013.01)

(58) Field of Classification Search
CPC ..... B60R 1/00; B60R 2300/105; H04N 7/181
USPC .................. 348/128–130; 701/23, 48, 50, 80; 382/103, 108
See application file for complete search history.

(56) References Cited

U.S. PATENT DOCUMENTS

| | | | | | |
|---|---|---|---|---|---|
| 4,700,223 | A | * | 10/1987 | Shoutaro et al. | 348/148 |
| 6,024,187 | A | * | 2/2000 | Takeda et al. | 180/408 |
| 6,061,001 | A | * | 5/2000 | Sugimoto | 340/903 |
| 6,122,573 | A | * | 9/2000 | Higashi et al. | 701/23 |
| 6,161,071 | A | * | 12/2000 | Shuman et al. | 701/48 |
| 7,298,869 | B1 | * | 11/2007 | Abernathy | 382/108 |
| 7,702,446 | B2 | * | 4/2010 | Hiwatashi | 701/80 |
| 8,169,309 | B2 | * | 5/2012 | Asari | 340/435 |
| 2005/0265579 | A1 | * | 12/2005 | Nishida | 382/103 |
| 2007/0078579 | A1 | * | 4/2007 | Schricker et al. | 701/50 |
| 2007/0185664 | A1 | * | 8/2007 | Tanaka et al. | 702/56 |
| 2012/0218411 | A1 | * | 8/2012 | Wu et al. | 348/148 |
| 2012/0268602 | A1 | * | 10/2012 | Hirai et al. | 348/148 |
| 2013/0170701 | A1 | * | 7/2013 | Suzuki et al. | 382/103 |
| 2013/0173208 | A1 | * | 7/2013 | Kuzunishi et al. | 702/141 |

FOREIGN PATENT DOCUMENTS

JP  2001-134889  5/2001

* cited by examiner

*Primary Examiner* — Paulos M Natnael
(74) *Attorney, Agent, or Firm* — Fujitsu Patent Center

(57) ABSTRACT

A road surface inspection device detects an abnormal region on a road surface from the road surface on a road image captured by a camera. The road surface inspection device determines whether the detected abnormal region overlaps a trace on the road image, along which the wheels of a patrol car are expected to pass on the road surface. When the abnormal region overlaps the trace of wheels, the road surface inspection device determines whether an acceleration at the measurement time corresponding to the captured time of the road image among the accelerations measured during driving on the road surface by a G-sensor is outside a predetermined range.

7 Claims, 12 Drawing Sheets

FIG.5

| DATA NAME | HIERARCHICAL STRUCTURE 1 | HIERARCHICAL STRUCTURE 2 | PURPOSE |
|---|---|---|---|
| caption | -- | -- | COMMENT ON DATA |
| date | -- | -- | DATA ACQUISITION DATE |
| pointData | mark | | BROWSING PURPOSE IDENTIFICATION: CHECKING NECESSITY OF REPAIR/NEXT INSPECTION CANDIDATE |
| | lat | | LATITUDE COORDINATE VALUE |
| | lng | | LONGITUDE COORDINATE VALUE |
| | movie | | FILE NAME OF VIDEO DATA |
| | frame | | FRAME TIME FROM START OF MOVIE DATA (ELAPSED TIME FROM START) |
| | Gv | time | MEASUREMENT TIME OF G-SENSOR VALUE |
| | | gdata | G-SENSOR VALUE |

FIG.6

```
<DataTable caption="THIRD VEHICLE: DRIVE ALONG ROUTE a" date="20111207" >
  <pointData mark="CHECKING REPAIR" lat="33.23382" lng="131.60612" movie="b2.flv" frame="12:55:45">
    <Gv time="12:55:45" gdata="0.9876" />
    <Gv time="12:55:46" gdata="1.2654" />
    <Gv time="12:55:47" gdata="0.9912" />
    ...
  </pointData>
  <pointData>
    ...
  </pointData>
</DataTable>
```

ROAD SURFACE INSPECTION DEVICE, ROAD SURFACE INSPECTION METHOD AND RECORDING MEDIUM

CROSS-REFERENCE TO RELATED APPLICATIONS

This application is based upon and claims the benefit of priority of the prior Japanese Patent Application No. 2011-290029, filed on Dec. 28, 2011, the entire contents of which are incorporated herein by reference.

FIELD

The embodiments discussed herein are related to a road surface inspection device.

BACKGROUND

The surface of a road is deteriorated by a vehicle traffic load and the action of a natural environment. Thus, a special vehicle such as a road surface state measurement vehicle drives on a road to periodically inspect the state of a pavement on the road. As a result of the inspection, when a bump, a groove, or a crack is detected on the road surface of a road, repair of the road is performed.
Patent Literature 1: Japanese Laid-open Patent Publication No. 2001-134889

However, in the related art, there is a problem in that it is difficult to detect the deterioration of the road surface at an early stage.

That is, since the road surface state measurement vehicle is expensive and rare, it is difficult to perform the inspection of the road surface frequently. Thus, when the road surface is inspected using the road surface state measurement vehicle, it is difficult to detect the deterioration of the road surface at an early stage. As a result, detection of the deterioration of the road surface is delayed, and the cost for repair increases.

SUMMARY

According to an aspect of the embodiments, a road surface inspection device includes: a memory and a processor coupled to the memory. The processor executes a process including: detecting an abnormal region on a road surface from the road surface on an image stored in an image storage that stores an image in which a road surface of a road is captured by an imaging device mounted on a vehicle and a captured time of the image in correlation; first determining whether the abnormal region overlaps a wheel trace stored in a trace storage that stores a trace on the image captured by the imaging device, along which the wheels of the vehicle are expected to pass on the road surface, or a trace along which wheels of the vehicle passes on the road surface; and when the abnormal region is determined to overlap the trace of the wheels, second determining whether an acceleration at a measurement time corresponding to the captured time of the image among accelerations stored in an acceleration storage that stores an acceleration measured during driving on the road surface by an acceleration sensor mounted on the vehicle and the measurement time of the acceleration in correlation is outside a predetermined range.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of tags used for description of browsing data;
FIG. 6 is a diagram illustrating a configuration example of the browsing data.

DESCRIPTION OF EMBODIMENTS

Preferred embodiments will be explained with reference to accompanying drawings. These embodiments do not limit the technique disclosed herein. The respective embodiments can be appropriately combined with each other within a range where the processing contents are not contradictory to each other.

[a] First Embodiment

Figure 1:
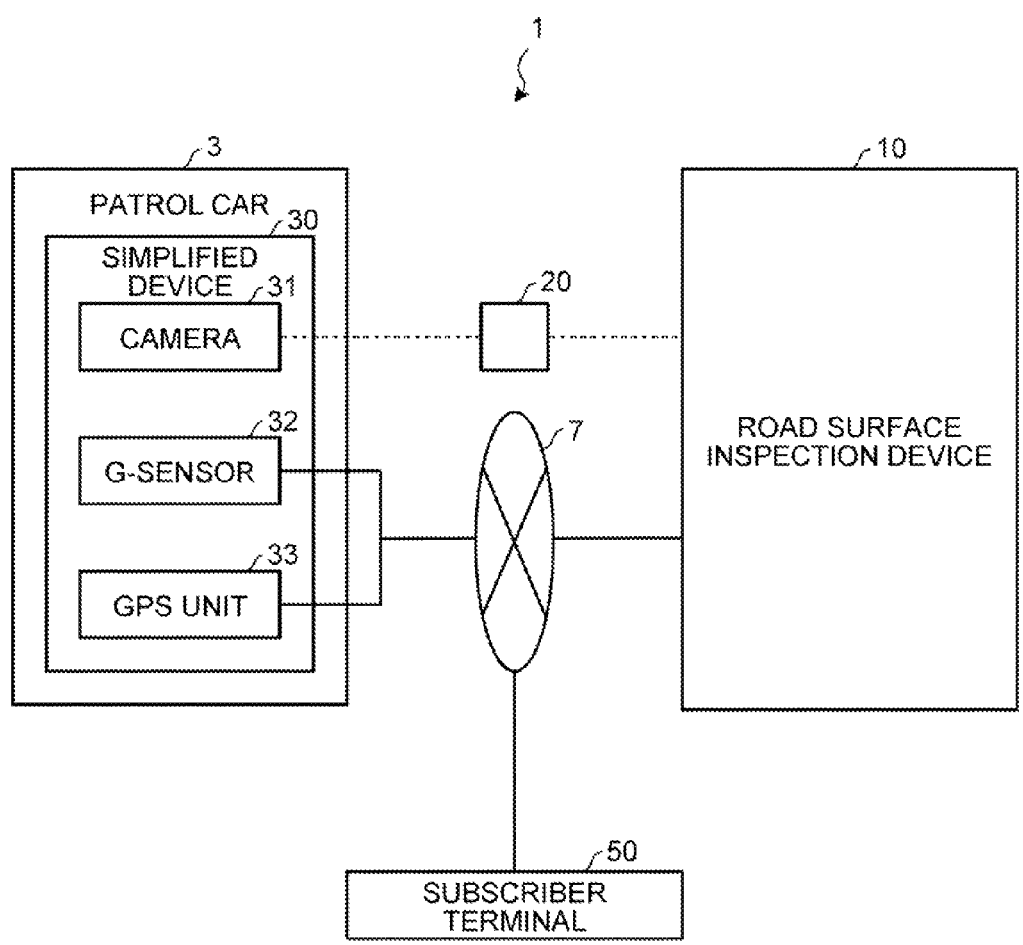
FIG. 1 is a diagram illustrating a configuration of a road surface inspection system according to a first embodiment.

System Configuration
First, a configuration of a road surface inspection system according to this embodiment will be described. FIG. 1 is a diagram illustrating the configuration of a road surface inspection system according to the first embodiment. A road surface inspection system 1 illustrated in FIG. 1 detects deterioration of a road surface from an image and an acceleration that are acquired during driving on a road by a simplified device 30 mounted on a patrol car 3.

As illustrated in FIG. 1, the road surface inspection system 1 includes a road surface inspection device 10, the simplified device 30, and a subscriber terminal 50. In the example of FIG. 1, although a case where the road surface inspection system 1 includes one simplified device 30 and one subscriber terminal 50 is illustrated, the disclosed system is not limited to this, and the disclosed system can be applied to a case where the simplified device and the subscriber terminal are included in an arbitrary number.

The road surface inspection device 10, the simplified device 30, and the subscriber terminal 50 are connected so that they can communicate with each other via a network 7.

As the network 7, an optional communication network such as the Internet, a local area network (LAN), or a virtual private network (VPN) can be employed regardless of whether the network 7 is a wired network or a wireless network. The road surface inspection device 10 and the simplified device 30 may exchange data via a memory card 20 as well as the network 7.

The simplified device 30 is an on-vehicle machine that is mounted on a patrol car 3. The patrol car 3 on which the simplified device 30 is mounted is a vehicle used for patrolling the road, and an automobile of an optional type can be employed as the patrol car 3 regardless of the size of a vehicle such as a light automobile, an ordinary automobile, or a large automobile, the purpose of use of a vehicle such as an ordinary vehicle, a business vehicle, or a special-purpose vehicle, and the number of wheels of a vehicle such as a four-wheel vehicle or a two-wheel vehicle.

A minimum number of sensors for allowing the road surface inspection device 10 described later to detect deterioration of a road surface are mounted on the simplified device 30. For example, the simplified device 30 includes a camera 31, a gravitation (G) sensor 32, and a global positioning system (GPS) unit 33. Although the example of FIG. 1 illustrates a case where three sensors are mounted on the simplified device 30, when at least the camera 31 and the G-sensor 32 are mounted on the simplified device 30, the simplified device 30 can allow the road surface inspection device 10 to detect deterioration of the road surface.

Among these sensors, the camera 31 is attached at a position where the camera 31 can image the road surface of a road. For example, the camera 31 may be attached to a predetermined position (for example, around the front number plate) of the front of the patrol car 3, or may be attached to a predetermined position (for example, around the rear number plate) of the rear of the patrol car 3. Moreover, the G-sensor 32 and the GPS unit 33 may be attached to an optional position of the patrol car 3. In this case, when the G-sensor 32 is provided at a position where shaking of the vehicle body is not absorbed by a suspension of the patrol car 3, minute shaking such as an inclination of a small stone or a slope other than a road surface deterioration such as a bump, a groove, or a crack results in an increase in the measured gravitational acceleration. Thus, the G-sensor 32 is preferably provided at a position where shaking of the vehicle body is absorbed by a suspension of the patrol car 3. In the following description, the image of the road captured by the camera 31 is sometimes referred to as a "road image." Moreover, in the following description, acceleration data including the gravitational acceleration measured by the G-sensor 32 and position data including the coordinate values of the longitude and latitude measured by the GPS unit 33 are sometimes collectively referred to as "sensing data."

The simplified device 30 uploads the road image and the sensing data to the road surface inspection device 10. As an embodiment, the simplified device 30 uploads the sensing data via the network 7 and uploads the road image via the memory card 20. As above, when uploading is performed via the memory card 20, the simplified device 30 writes video data of a movie including frames of a plurality of road images into the memory card 20. The memory card 20 is carried to the road surface inspection device 10 or the subscriber terminal 50 by an inspector being aboard the patrol car 3, and the video data is read after the memory card 20 is inserted to a card reader installed or mounted on the road surface inspection device 10 or the subscriber terminal 50. In this case, when the video data is read by the subscriber terminal 50, the video data is uploaded from the subscriber terminal 50 to the road surface inspection device 10 via the network 7. As the memory card 20, a semiconductor memory capable of rewriting data such as a flash memory or a nonvolatile static random access memory (NVSRAM) can be employed. Moreover, a storage device such as a hard disk or an optical disc can be used instead of the memory card 20.

As above, when the simplified device 30 is mounted on the patrol car 3, a number of radar-based displacement meters or a number of cameras do not have to be provided such as a road surface state measurement vehicle, and a measurement control device for performing adaptive measurement with a radar-based displacement meter or a camera does not have to be provided.

In this example, although a case where the road image is uploaded via the memory card 20 has been illustrated, the road image may be uploaded via the network 7 similarly to the sensing data. Moreover, when the video data or the sensing data is uploaded via the network 7, the data may be uploaded in realtime and may be uploaded in a batch process.

The road surface inspection device 10 is a server device that provides a road surface inspection service. The road surface inspection device 10 may be implemented as a web server and may be implemented as a cloud server. As an embodiment, the road surface inspection device 10 detects deterioration of the road surface using the video data and the sensing data uploaded from the simplified device 30. After that, upon receiving a deterioration position browse request from the subscriber terminal 50 described later, the road surface inspection device 10 provides the following information to the subscriber terminal 50. That is, the road surface inspection device 10 provides the road image in which a road surface deterioration is detected, a change in the gravitational acceleration around the captured time of the road image, and the coordinate values of the latitude and longitude to the subscriber terminal 50.

The subscriber terminal 50 is a terminal device which is used by a subscriber who subscribes to the road surface inspection service. As an embodiment of the subscriber terminal 50, a fixed terminal including a personal computer (PC) can be employed. As another embodiment, a mobile terminal such as a portable phone, a personal handyphone system (PHS), or a personal digital assistant (PDA) can also be employed.

Here, the road surface inspection device 10 according to this embodiment detects an abnormal region of the pavement on the road surface from the road surface on the road image captured by the camera 31. Further, the road surface inspection device 10 according to this embodiment determines whether the detected abnormal region overlaps a trace on the road image, along which the wheels of the patrol car 3 pass on the road surface. In addition, when the abnormal region overlaps the wheel trace, the road surface inspection device 10 according to this embodiment determines whether an acceleration at a measurement time corresponding to the captured time of the road image among the accelerations measured by the G-sensor 32 during the driving on the road surface is outside a predetermined range.

As above, in the road surface inspection device 10 according to this embodiment, it is possible to detect the deterioration of the road surface if at least the road image captured by the camera 31 and the gravitational acceleration measured by the G-sensor 32 are obtained. Therefore, in the road surface inspection device 10 according to this embodiment, a number of radar-based displacement meters or a number of cameras do not have to be provided in the vehicle such as a road surface state measurement vehicle, and a measurement control device for performing adaptive measurement with a radar-based displacement meter or a camera does not have to be provided.

Thus, in the road surface inspection device 10 according to this embodiment, since it is possible to decrease the cost of the equipment of the patrol car 3 and simplify the configuration of the patrol car 3, it is possible to inspect the road surface frequently.

Therefore, according to the road surface inspection device 10 according to this embodiment, it is possible to detect the deterioration of the road surface at an early stage. In addition, in the road surface inspection device 10 according to this embodiment, since the deterioration of the road surface can be detected at an early stage, it is possible to decrease the cost for repairing the road.

Configuration of Simplified Device 30

Figure 2:
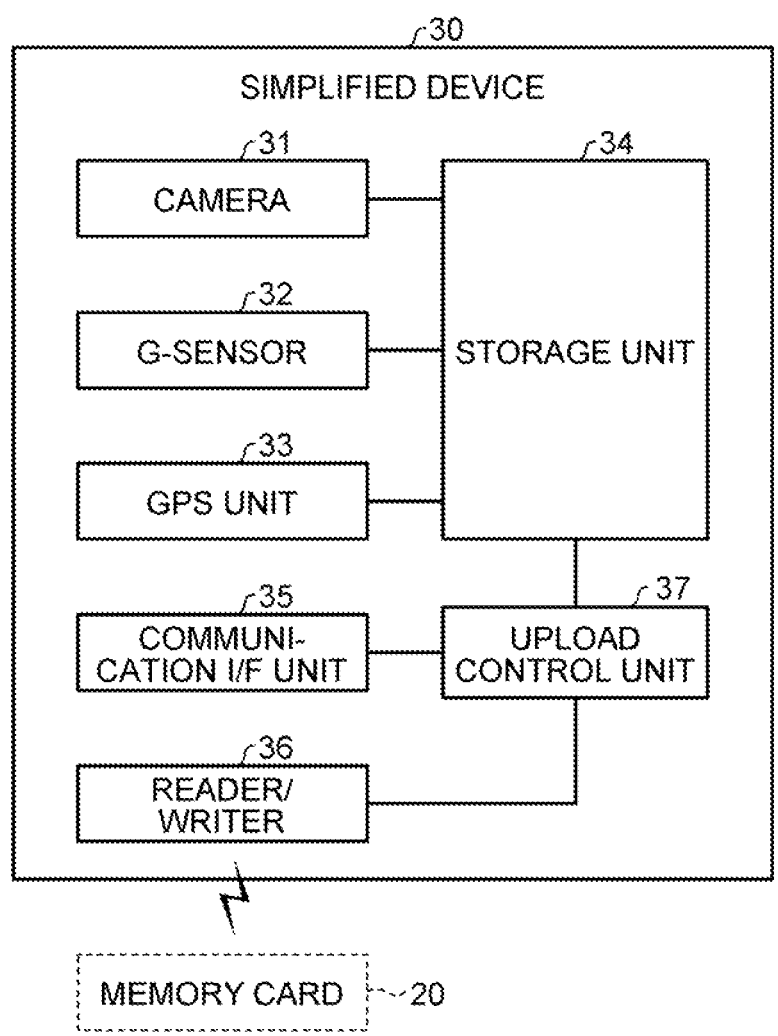
FIG. 2 is a block diagram illustrating a functional configuration of a simplified device according to the first embodiment.

Next, a functional configuration of the simplified device 30 included in the road surface inspection system according to this embodiment will be described. FIG. 2 is a block diagram illustrating a functional configuration of the simplified device 30 according to the first embodiment. As illustrated in FIG. 2, the simplified device 30 includes the camera 31, the G-sensor 32, the GPS unit 33, a storage unit 34, a communication interface (I/F) unit 35, a reader/writer 36, and an upload control unit 37. The simplified device 30 may further include another sensor such as, for example, a vehicle speed sensor or a steering angle sensor, other than the above sensors.

Among these sensors, the camera 31 is an imaging device that captures an image using an imaging element such as a charge coupled device (CCD) or a complementary metal oxide semiconductor (CMOS). As an embodiment, when capturing a road image at a predetermined frame rate, the camera 31 correlates the road image with a captured time by embedding the captured time in the frames of the road image as header information and then stores the road image in the storage unit 34. The captured time may be an elapsed time from the first frame of the road image, and may use a global time measured according to a time stamp or the like. Moreover, the frame rate may be set to a value such that the same position of a road partially overlaps between the frames of the road image. For example, 24 frames per second (fps), 30 fps, 60 fps, and the like can be employed. In the following description, it is assumed that video data in which the road image is encoded in encoding data of a movie by an encoder (not illustrated) is stored in the storage unit 34 described below.

The G-sensor 32 is a sensor that measures an gravitational acceleration. As an embodiment, when measuring an gravitational acceleration, the G-sensor 32 stores acceleration data in which the gravitational acceleration and the measured time are correlated in the storage unit 34 described later. As a method of measuring the acceleration, an optional method such as a mechanical method or an optical method including a semiconductor method can be employed. In the following description, although a case where the G-sensor 32 measures the gravitational acceleration at a cycle of one second is considered, the measurement cycle of the G-sensor 32 is not limited to this, and the G-sensor 32 can be applied to a case where the gravitational acceleration is measured at an optional cycle. Moreover, although this example illustrates a case where the simplified device 30 includes the G-sensor 32 that measures the gravitational acceleration, a three-axis acceleration sensor that measures accelerations in the X, Y, and Z-axis directions can also be employed.

The GPS unit 33 is a unit that measures the coordinate values of the latitude and longitude by receiving radio waves from a plurality of GPS satellites and calculating the distance to the respective GPS satellites. As an embodiment, when measuring the coordinate values of the latitude and longitude, the GPS unit 33 stores position data in the storage unit 34 described below so that the coordinate values and the measured time are correlated. In the following description, although a case where the GPS unit 33 measures the coordinate values of the latitude and longitude at a cycle of one second is considered, the measurement cycle of the GPS unit 33 is not limited to this, and the GPS unit 33 can be applied to a case where the coordinate values are measured at an optional cycle.

The storage unit 34 is a storage device that stores various types of data. As an embodiment of the storage unit 34, a storage device such as a hard disk or an optical disc can be employed in addition to a semiconductor memory capable of rewriting data such as a flash memory or a nonvolatile static random access memory (NVSRAM).

For example, the storage unit 34 stores sensing data such as acceleration data or position data including video data. In addition to this, the storage unit 34 stores wheel trace data that represents an expected trace on a road image, along which the wheels of the patrol car 3 pass on the road surface. The wheel trace data is set by calibrating the size and the position of a region on the road image, which the wheels are expected to pass using an attachment angle of the camera 31 attached to the patrol car 3.

The communication I/F unit 35 is an interface that controls the communication with other devices, for example, with the road surface inspection device 10. For example, the communication I/F unit 35 transmits the sensing data stored in the storage unit 34 to the road surface inspection device 10. As an embodiment of the communication I/F unit 35, a network interface card (NIC) such as a LAN card, or a modem can be employed.

In this example, although a case where the sensing data is transmitted to the road surface inspection device 10 via the communication I/F unit 35 is illustrated, the uploading via communication does not have to be executed. For example, the sensing data may be uploaded via the memory card 20. In this case, the reader/writer 36 is controlled by the upload control unit 37 described later, whereby the sensing data is written to the memory card 20.

The reader/writer 36 is a device that reads data from the memory card 20 and writes data to the memory card 20. As an embodiment, the reader/writer 36 writes the wheel trace data to the memory card 20 together with the video data stored in the storage unit 34 upon receiving a write instruction from the upload control unit 37 described later in a state where the memory card 20 is attached to a predetermined position.

The upload control unit 37 is a processing unit that controls the uploading to the road surface inspection device 10. As an embodiment, when the sensing data such as the acceleration data and the position data is written to the storage unit 34 by the G-sensor 32 or the GPS unit 33, the upload control unit 37 controls the communication I/F unit 35 so as to transmit the sensing data to the road surface inspection device 10. Moreover, the upload control unit 37 performs the following process when an operation of writing video data is received from a road inspector, or the amount of the video data stored in the storage unit 34 reaches a predetermined data size. That is, the upload control unit 37 controls the reader/writer 36 so as to write the wheel trace data to the memory card 20 together with the video data stored in the storage unit 34. In this case, the upload control unit 37 may write the wheel trace data to the memory card 20 only when the attachment position of the camera 31 is changed so that the same wheel trace data is not uploaded redundantly. Moreover, the upload control unit 37 deletes uploaded sensing data and video data from the storage unit 34 when the sensing data is transmitted to the road surface inspection device 10 or when the video data is written to the memory card 20.

Various types of integrated circuits and electronic circuits can be employed as the upload control unit 37. An application specific integrated circuit (ASIC) is an example of the integrated circuit. Moreover, a central processing unit (CPU) and a microprocessing unit (MPU) are examples of the electronic circuit.

Configuration of Road Surface Inspection Device 10

Figure 3:
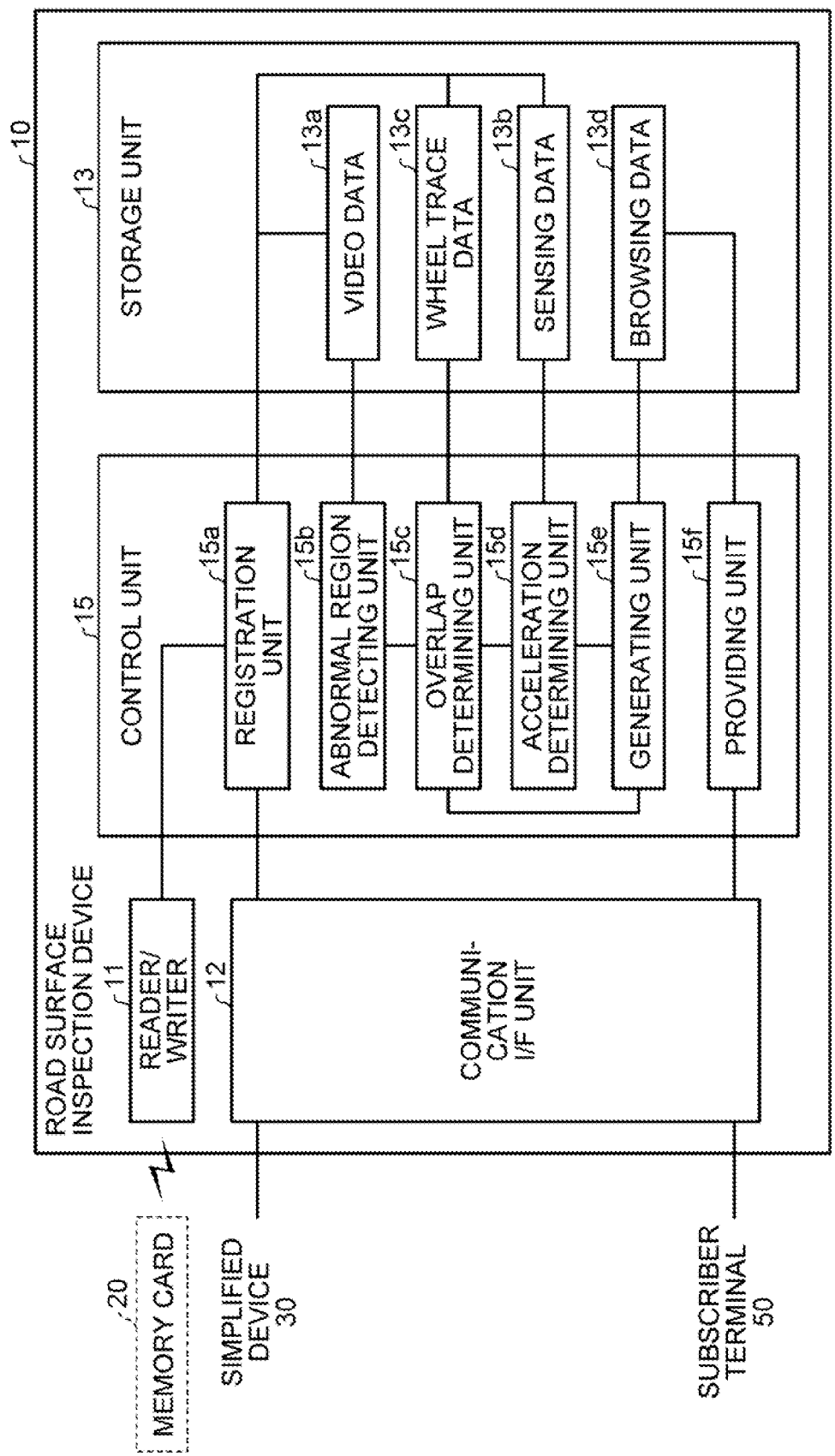
FIG. 3 is a block diagram illustrating a functional configuration of a road surface inspection device according to the first embodiment.

Next, a functional configuration of the road surface inspection device 10 according to this embodiment will be described. FIG. 3 is a block diagram illustrating a functional configuration of the road surface inspection device 10 according to the first embodiment. As illustrated in FIG. 3, the road surface inspection device 10 includes a reader/writer 11, a communication I/F unit 12, a storage unit 13, and a control unit 15.

Among these functional units, the reader/writer 11 is a device that reads data from the memory card 20 and writes data to the memory card 20. As an embodiment, the reader/writer 11 reads the wheel trace data together with the video data stored in the memory card 20 upon receiving a read instruction from a registration unit 15a described below in a state where the memory card 20 is attached to a predetermined position. Moreover, the reader/writer 11 outputs the video data and the wheel trace data to the registration unit 15a described below.

The communication I/F unit 12 is an interface that controls the communication with other devices, for example, with the simplified device 30 or the subscriber terminal 50. For example, the communication I/F unit 12 receives the sensing data from the simplified device 30 and transmits browsing data to be browsed by the road inspector to the subscriber terminal 50. As an embodiment of the communication I/F unit 12, a network interface card such as a LAN card can be employed.

The storage unit 13 is a storage device such as a semiconductor memory device (for example, a flash memory), a hard disk, or an optical disc. The storage unit 13 is not limited to the above-mentioned storage device, but a random access memory (RAM) or a read only memory (ROM) may be used.

The storage unit 13 stores an operating system (OS) that is executed by the control unit 15 and various programs such as a road surface inspection program for inspecting the road surface. Further, the storage unit 13 stores video data 13a, sensing data 13b, wheel trace data 13c, and browsing data 13d as examples of data for execution of the program executed by the control unit 15.

The video data 13a is video data of the road imaged by the camera 31 mounted on the patrol car 3. As an example, in the video data 13a, video data read from the memory card 20 by the reader/writer 11 is registered by the registration unit 15a described later for each vehicle number of the patrol car 3. As another example, the video data 13a is referred to by an abnormal region detecting unit 15b described later in order to detect an abnormal region on the road image such as a region where discoloration is present in the pavement of the road surface.

The sensing data 13b is data including the acceleration data and the position data acquired by sensors that are mounted on the patrol car 3. As an example, in the sensing data 13b, sensing data received from the simplified device 30 is registered by the registration unit 15a described later for each vehicle number of the patrol car 3. As another example, the sensing data 13b is referred to by an acceleration determining unit 15d described later in order to determine whether an abnormality such as irregularity is present in the gravitational acceleration.

The wheel trace data 13c is data that represents an expected trace on the road image, along which the wheels of the patrol car 3 pass on the road surface. As an example, in the wheel trace data 13c, wheel trace data received from the simplified device 30 is registered by the registration unit 15a described below for each vehicle number of the patrol car 3. As an other example, the wheel trace data 13c is referred to by an overlap determining unit 15c described below in order to determine whether an abnormal region on the road image in which discoloration or the like is detected in the pavement of the road surface overlaps the expected trace along which the wheels of the patrol car 3 pass on the road surface.

Figure 4:
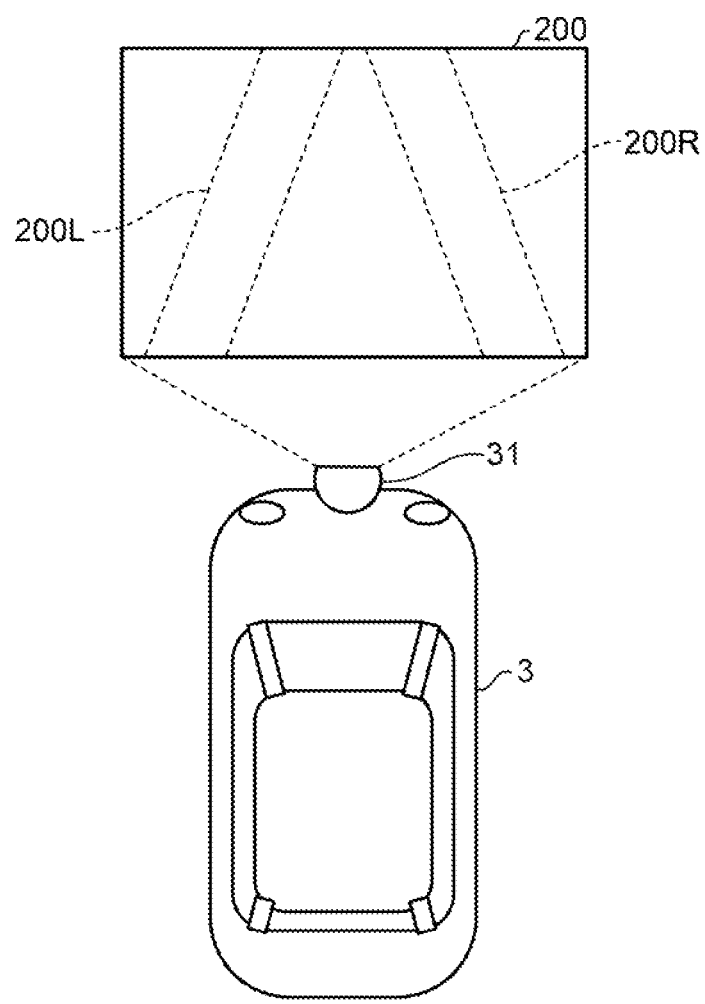
FIG. 4 is a diagram illustrating an example of wheel trace data.

FIG. 4 is a diagram illustrating an example of the wheel trace data 13c. In the example of FIG. 4, a case where the camera 31 is attached to the front of the patrol car 3 will be considered. Reference numeral 200 illustrated in FIG. 4 represents a road image. Moreover, reference numerals 200L and 200R illustrated in FIG. 4 represent the expected traces on the road image 200 along which the wheels of the patrol car 3 pass on the road surface. The wheel trace data 13c is set by calibrating the size and the position of a region on the road image, which the left and right wheels are expected to pass using the attachment angle of the camera 31 attached to the patrol car 3.

As illustrated in FIG. 4, the two regions of the trace 200L on the road image 200, along which the left wheel of the patrol car 3 is expected to pass on the road surface, and the trace 200R on the road image 200, along which the right wheel of the patrol car 3 is expected to pass on the road surface are defined as the wheel trace data 13c. In the example of FIG. 4, although a case where the width in the horizontal direction of the traces 200L and 200R is fixed is illustrated, the traces 200L and 200R are preferably defined so that the width in the horizontal direction decreases as the trace approaches the disappearance point in the road image 200.

The browsing data 13d is various types of data to be browsed by the road inspector. As an example, when an abnormality such as irregularity is detected in the gravitational acceleration at a timing at which the wheels of the patrol car 3 are expected to pass through an abnormal region on the road image in which discoloration is detected in the pavement of the road surface, deterioration data for allowing the road inspector to check the necessity of repair is generated. That is, deterioration data in which a change in the gravitational acceleration around the captured time of the road image in which an abnormality such as a discoloration is detected in the pavement of the road surface, the coordinate values of the latitude and longitude, including the road image are correlated is generated by the generating unit 15e described later as the browsing data. As another example, even if discoloration is detected in the pavement of the road surface on the road image, when the abnormal region does not overlap the trace along which the wheels of the patrol car 3 are expected to pass, deterioration candidate data for prompting inspection on the next patrol of the patrol car 3 is generated. That is, deterioration candidate data in which a change in the gravitational acceleration around the captured time of the road image in which an abnormality such as a discoloration is detected in the pavement of the road surface, the coordinate values of the latitude and longitude, including the road image are correlated is generated by the generating unit 15e described later as the browsing data.

FIG. 5 is a diagram illustrating an example of a tag used for describing the browsing data. As illustrated in FIG. 5, in description of the browsing data 13d, three tags of "caption," "date," and "pointData" are used. Among these tags, the tag "caption" is a tag used for describing a comment on data. The tag "date" is a tag used for describing the captured date of the video data. The tag "pointData" is a tag used for describing various items of information on a point at which the deterioration of the road surface is detected. Moreover, the "pointData" is further hierarchized to six low-level tags including "mark," "lat," "lng," "movie," "frame," and "Gv." Among these tags, the tag "mark" is a tag used for describing whether the browsing data is deterioration data for checking repair or deterioration candidate data for the next inspection. The tag "lat" is a tag used for describing a coordinate value of latitude. The tag "lng" is a tag used for describing a coordinate value of longitude. The tag "movie" is a tag used for describing a file name of video data. The tag "frame" is a tag used for describing a captured time of a road image. The tag "Gv" is a tag used for describing various items of information on the G-sensor. Moreover, the tag "Gv" is further hierarchized into two low-level tags including "time" and "gdata." Among these tags, the tag "time" is a tag used for describing a measurement time at which the G-sensor measures an gravitational acceleration. The tag "gdata" is a tag used for describing an gravitational acceleration measured by the G-sensor.

FIG. 6 is a diagram illustrating a configuration example of the browsing data. In the example of FIG. 6, the browsing data 13d represents that the third patrol car 3 turns on a route a on 2011/12/07 (yyyy/mm/dd). Further, the "pointData" on the first row illustrated in FIG. 6 represents that the data is deterioration data for checking repair, in which an abnormality such as irregularity is detected in the gravitational acceleration at a timing at which the wheels of the patrol car 3 are expected to pass through an abnormal region where a discoloration is detected in the pavement of the road surface on the road image. In addition, the "pointData" on the first row illustrated in FIG. 6 represents that the road image in which a road surface deterioration is detected is captured at a position at which the latitude is "33:23:382 (hh:mm:sss)," and the longitude is "131:60:612." Furthermore, the "pointData" on the first row illustrated in FIG. 6 represents that the file name of the video data including the road image is "b2.flv." Furthermore, the "pointData" on the first row illustrated in FIG. 6 represents that the captured time of the road image in which the road surface deterioration is detected is "12:55:45 (hh:mm:ss)." Furthermore, the "pointData" on the first row illustrated in FIG. 6 represents that the following gravitational acceleration is measured for three minutes "12:55:45 to 12:58:45" around the timing at which the wheels of the patrol car 3 are expected to pass through an abnormal region where a discoloration is detected in the pavement of the road surface on the road image. That is, the "pointData" represents that the gravitational acceleration is changing from 0.9876 cm/s$^2$ to 1.2654 cm/s$^2$, 0.9912 cm/s$^2$, and so on every second from the time 12:55:45. The example of FIG. 6 illustrates a case where the camera 31 is attached to the front of the patrol car 3, and a change in the gravitational acceleration for three minutes from the captured time of the road image is correlated with the road image in which the road surface deterioration is detected.

The control unit 15 includes a program in which various processing procedures are described and an internal memory for storing control data, and executes various processes using the program and the control data. As illustrated in FIG. 3, the control unit 15 includes the registration unit 15a, the abnormal region detecting unit 15b, the overlap determining unit 15c, the acceleration determining unit 15d, the generating unit 15e, and the providing unit 15f.

Among these units, the registration unit 15a is a processing unit that registers the video data, the wheel trace data, and the sensing data uploaded from the simplified device 30 in the storage unit 13. As an embodiment, when the video data is read from the memory card 20 by the reader/writer 11, the registration unit 15a registers the video data in the storage unit 13 for each vehicle number of the patrol car 3. As another embodiment, when the wheel trace data is read from the memory card 20 by the reader/writer 11, the registration unit 15a registers the wheel trace data in the storage unit 13 for each vehicle number of the patrol car 3. As a further embodiment, when the sensing data is received from the simplified device 30, the registration unit 15a registers the sensing data in the storage unit 13 for each vehicle number of the patrol car 3.

The abnormal region detecting unit 15b is a processing unit that detects an abnormal region of the road surface pavement from the road surface on the road image using the video data 13a.

As an embodiment, the abnormal region detecting unit 15b starts its processing when new video data 13a is registered in the storage unit 13. First, the abnormal region detecting unit 15b sequentially reads the frames of a road image included in the video data 13a stored in the storage unit 13. Moreover, the abnormal region detecting unit 15b specifies a target region that is to be subjected to image processing within the road image. For example, the abnormal region detecting unit 15b calculates a predetermined fraction (for example, half height H2) of the height H1 of a vanishing point Vp that is obtained in advance by calibration from the angle of view of the camera 31 within the road image. Moreover, the abnormal region detecting unit 15b narrows the road image down to a region E having the calculated height H2 or smaller and then executes the subsequent image processing. The reason why the target region to be subjected to image processing is restricted is to exclude a region which is near the vanishing point on the road image and in which only a small amount of details are captured from the target region to be subjected to image processing and to reduce the amount of computation associated with image processing. In the following description, the region having the height of H2 or smaller within the road image is sometimes referred to as an "image processing execution target region."

After that, the abnormal region detecting unit 15b detects an abnormal region, in which it can be estimated that a discoloration or the like is present in the pavement of the road surface, from the specified image processing execution target region E. For example, the abnormal region detecting unit 15b calculates an average value of intensity or hue of the respective pixels in the image processing execution target region E. Moreover, the abnormal region detecting unit 15b extracts pixels of which the color difference from the average value of the intensity or hue of the respective pixels is equal to or greater than a predetermined threshold value Δa and labels a region in which the pixels having a color difference of the threshold value Δa or more are continuous. By the labeling, the abnormal region detecting unit 15b detects an abnormal region in which it can be estimated that a discoloration is detected from the colors of the asphalt or the cement.

The overlap determining unit 15c is a processing unit that determines whether the abnormal region detected by the abnormal region detecting unit 15b overlaps the trace along which the wheels of the patrol car 3 are expected to pass on the road surface using the wheel trace data 13c.

As an embodiment, the overlap determining unit 15c calculates the number of pixels that constitute the abnormal region, that is, the area of the abnormal region, and then determines whether the area of the abnormal region is equal to or greater than a predetermined threshold value Δb. In this case, the overlap determining unit 15c may calculate the area of the abnormal region by setting a greater weight to pixels that are near the vanishing point among the pixels that constitute the abnormal region. By determining the size of the area, the overlap determining unit 15c determines whether the abnormal region has a size such that it can be estimated that the abnormal region is a bump, a groove, or a crack on the road surface, that is, whether the abnormal region is a small stone or the like.

When the area of the abnormal region is smaller than the predetermined threshold value Δb, it can be estimated that the abnormal region is less likely to be a bump, a groove, or a crack on the road surface. Thus, the overlap determining unit 15c does not execute the subsequent image processing. On the other hand, when the area of the abnormal region is equal to or greater than the predetermined threshold value Δb, it can be estimated that the abnormal region is highly likely to be a bump, a groove, or a crack on the road surface. Thus, the overlap determining unit 15c further determines whether an average value of the luminance of the pixels that constitute the abnormal region is equal to or smaller than a predetermined threshold value Δc. By determining the magnitude of the luminance, the overlap determining unit 15c can determine whether the abnormal region is such dark that it can be estimated that the abnormal region is different from a road mark such as a white line painted on the road surface.

Here, when the average value of the luminance of the pixels that constitute the abnormal region is equal to or smaller than the predetermined threshold value Δc, the overlap determining unit 15c further determines whether the abnormal region overlaps the trace along which the wheels of the patrol car 3 are expected to pass, defined by the wheel trace data 13c. By the overlap determination, it is possible to determine whether the wheels of the patrol car 3 pass on the abnormal region in the subsequent frames of the road image. In this case, when at least one of the pixels that constitute the abnormal region overlap the expected trace of the wheels, the overlap determining unit 15c determines that the abnormal region and the expected trace overlap so that substantially all samples in which deterioration of the road surface is suspicious are extracted.

The acceleration determining unit 15d is a processing unit that determines whether the acceleration at the measurement time corresponding to the captured time of the road image is outside a predetermined range R using the sensing data 13b. The fact that the acceleration is outside the predetermined range R means that a vehicle passes through a certain step.

As an embodiment, the acceleration determining unit 15d executes the following processes when the overlap determining unit 15c determines that the abnormal region overlaps the expected trace of the wheels. That is, the acceleration determining unit 15d sets an acceleration monitoring target zone which starts from the captured time of the currently read road image and which includes a time at which it is expected that the wheels of the patrol car 3 pass through the abnormal region from the vehicle speed of the patrol car 3 that is obtained from an optical flow of the frames of the road image. For example, the acceleration determining unit 15d sets the captured time of the road image as the starting point of the monitoring target zone and sets the length to the ending point of the monitoring target zone so that the slower the vehicle speed of the patrol car 3, the greater the length. The vehicle speed of the patrol car 3 may be acquired from a vehicle speed sensor (not illustrated) mounted on the patrol car 3 without using the optical flow.

After that, the acceleration determining unit 15d determines whether any one of the maximum value and the minimum value of the gravitational acceleration corresponding to the monitoring target zone among the sensing data 13b is outside the predetermined range R. In this case, the acceleration determining unit 15d can also change the range R dynamically so that the slower the vehicle speed of the patrol car 3, the greater the difference between the upper limit value and the lower limit value of the range R. By the acceleration determination, the acceleration determining unit 15d can determine whether the abnormal region is an irregularity such as a bump, a groove, or a crack, that is whether the abnormal region is a discoloration caused by a water pool having a small irregularity.

The generating unit 15e is a processing unit that generates browsing data to be browsed by the road inspector. As an embodiment, when an abnormality such as irregularity is detected in the gravitational acceleration at a timing at which the wheels of the patrol car 3 are expected to pass through an abnormal region on the road image in which discoloration is detected in the pavement of the road surface, the generating unit 15e generates deterioration data for allowing the road inspector to check the necessity of repair. That is, the generating unit 15e generates deterioration data in which a change in the gravitational acceleration around the captured time of the road image in which an abnormality such as a discoloration is detected in the pavement of the road surface, the coordinate values of the latitude and longitude, including the road image are correlated as the browsing data. In this case, the generating unit 15e describes "deterioration data for checking repair" in the tag "mark" of the tag "pointData." Further, the generating unit 15e describes a change in the gravitational acceleration during a predetermined period (for example, 3 minutes) from the captured time of the road image in the tag "gdata" of the tag "Gv."

As another embodiment, even if discoloration is detected in the pavement of the road surface on the road image, when the abnormal region does not overlap the trace along which the wheels of the patrol car 3 are expected to pass, the generating unit 15e generates deterioration candidate data for prompting inspection on the next patrol of the patrol car 3. That is, the generating unit 15e generates deterioration candidate data in which a change in the gravitational acceleration around the captured time of the road image in which an abnormality such as a discoloration is detected in the pavement of the road surface and the coordinate values of the latitude and longitude, including the road image are correlated as the browsing data. In this case, the generating unit 15e describes "deterioration candidate data for the next inspection" in the tag "mark" of the tag "pointData." When the deterioration candidate data is generated, since the abnormal region and the expected trace of the wheels do not overlap, the tags "time" and "gdata" of the tag "Gv" do not have to be described.

Figure 7:
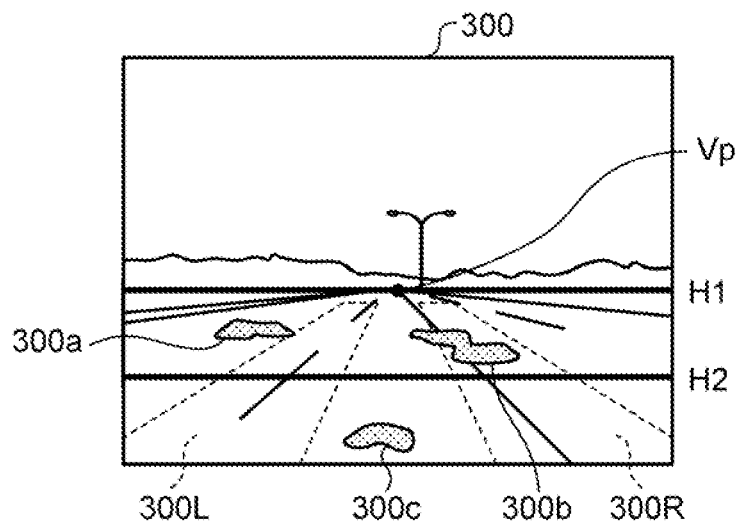
FIG. 7 is a diagram illustrating an example of a road image.
Figure 8:
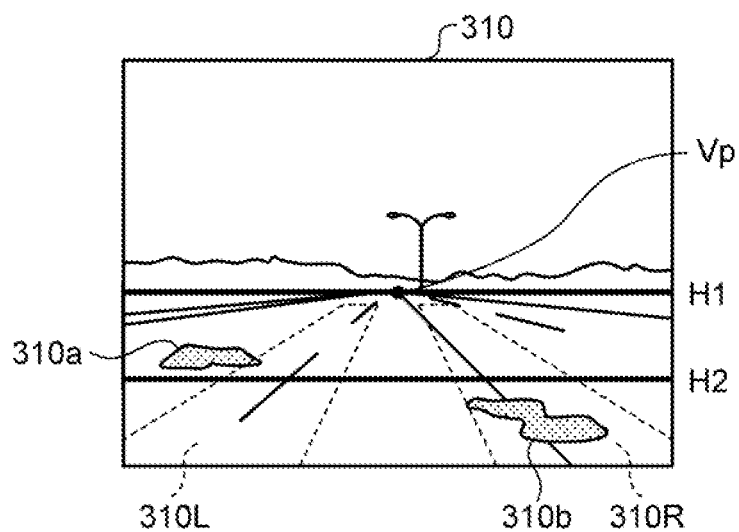
FIG. 8 is a diagram illustrating an example of a road image.
Figure 9:
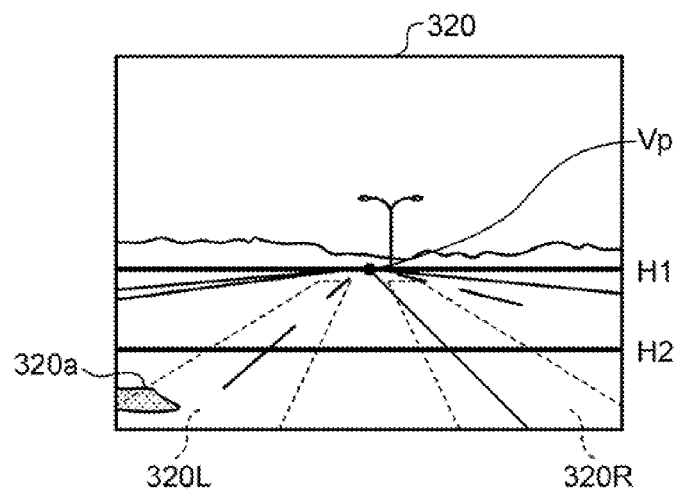
FIG. 9 is a diagram illustrating an example of a road image.

Here, a specific example of a method of generating browsing data will be described with reference to FIGS. 7 to 9. FIGS. 7 to 9 are diagrams illustrating an example of a road image. In the example of FIG. 7, it is assumed that the captured time t1 of a road image 300 is earlier than the captured time t2 of a road image 310 that is earlier than the captured time t3 of a road image 320. An abnormal region 300a illustrated in FIG. 7 is captured as an abnormal region 310a on the road image 310 illustrated in FIG. 8 and is captured as an abnormal region 320a on the road image 320 illustrated in FIG. 9. Moreover, an abnormal region 300b illustrated in FIG. 7 is captured as an abnormal region 310b on the road image 310 illustrated in FIG. 8.

In the case of the road image 300 illustrated in FIG. 7, a region having a height of H2 or smaller that is half the height H1 of the vanishing point Vp is specified by the abnormal region detecting unit 15b as the image processing execution target region E. Since only an abnormal region 300c among abnormal regions 300a to 300c is included in the image processing execution target region E, only the abnormal region 300c is detected by the abnormal region detecting unit 15b. The abnormal region 300c does not overlap traces 300L and 300R along which the left and right wheels of the patrol car 3 are expected to pass. As above, although it is possible to detect the abnormal region 300c, it is difficult to determine whether the abnormal region 300c results from an irregularity such as a bump, a groove, or a crack, or from a discoloration caused by a water pool having a small irregularity. Thus, since the abnormal region 300c is worth inspecting on the next patrol, deterioration candidate data for the next inspection is generated from the road image 300.

In the case of the road image 310 illustrated in FIG. 8, a region having a height of H2 or smaller that is half the height H1 of the vanishing point Vp is also specified by the abnormal region detecting unit 15b as the image processing execution target region E. Since only the abnormal region 310b among abnormal regions 310a and 310b is included in the image processing execution target region E, only the abnormal region 310b is detected by the abnormal region detecting unit 15b. The abnormal region 310b overlaps the trace 310R of traces 310L and 310R along which the left and right wheels of the patrol car 3 are expected to pass. In this case, if the acceleration at the measurement time corresponding to the captured time of the road image is outside the predetermined range R, it can be determined that the abnormal region 310b results from an irregularity such as a bump, a groove, or a crack. Thus, since the abnormal region 310b is worth checking the necessity of repair, deterioration data for checking repair is generated from the road image 310.

In the case of the road image 320 illustrated in FIG. 9, a region having a height of H2 or smaller that is half the height H1 of the vanishing point Vp is also specified by the abnormal region detecting unit 15b as the image processing execution target region E. Since only the abnormal region 320a is included in the image processing execution target region E, only the abnormal region 320a is detected by the abnormal region detecting unit 15b. The abnormal region 320a overlaps traces 320L among traces 320L and 320R along which the left and right wheels of the patrol car 3 are expected to pass. In this case, if the acceleration at the measurement time corresponding to the captured time of the road image is within the predetermined range R, it can be said that it is worth checking with the naked eyes whether the abnormal region 320a results from an irregularity such as a bump, a groove, or a crack. Thus, deterioration candidate data for the next inspection is generated from the road image 320.

The providing unit 15f is a processing unit that provides the browsing data 13d to the subscriber terminal 50 in response to a browse request from the subscriber terminal 50. As an embodiment, upon receiving a browse request from the subscriber terminal 50, the providing unit 15f generates a map screen in which the coordinate position of the position data included in the sensing data 13b is mapped onto map information of a predetermined range (for example, a jurisdictional area). In this case, the providing unit 15f maps the coordinate positions corresponding to the deterioration data and the deterioration candidate data included in the browsing data 13d among the coordinate positions of the position data included in the sensing data 13b in a display form different from that of the other coordinate positions. Moreover, the providing unit 15f transmits a map screen, in which the coordinate positions corresponding to the deterioration data and the deterioration candidate data are mapped in a different display form, to the subscriber terminal 50.

Figure 10:
FIG. 10 is a diagram illustrating an example of a screen transmitted to a subscriber terminal.

FIG. 10 is a diagram illustrating an example of a screen transmitted to the subscriber terminal 50. As illustrated in FIG. 10, a map screen 400 on which the coordinate positions of the position data included in the sensing data 13b are mapped is displayed on the subscriber terminal 50. In the map screen 400, a coordinate position 400a corresponding to the deterioration data included in the browsing data 13d is displayed as a black mark. Further, in the map screen 400, a coordinate position 400b corresponding to the deterioration candidate data is displayed as a dotted mark.

After that, when the coordinate values of the latitude and longitude corresponding to the deterioration data or the deterioration candidate data are selected on the map screen by the subscriber terminal 50, the providing unit 15f generates a browsing screen including a road image, a change in the gravitational acceleration before a predetermined period elapses from the captured time of the road image, and a map screen and transmits the browsing screen to the subscriber terminal 50.

Figure 11:
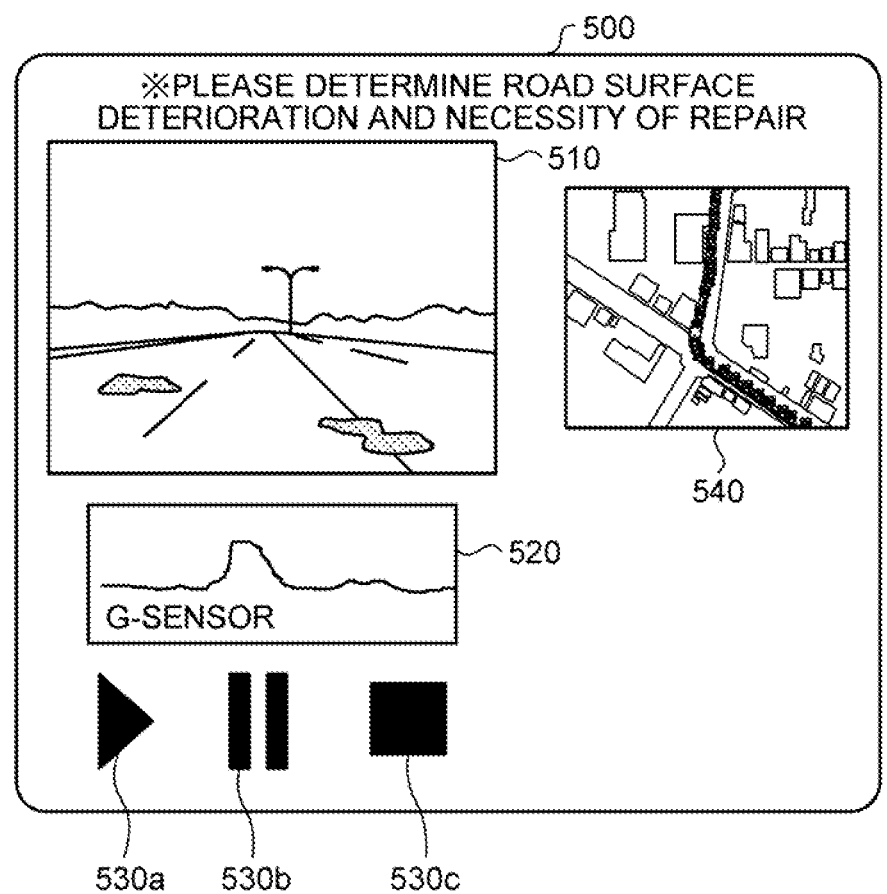
FIG. 11 is a diagram illustrating an example of a screen transmitted to a subscriber terminal.

FIG. 11 is a diagram illustrating an example of a screen transmitted to the subscriber terminal 50. As illustrated in FIG. 11, the browsing screen 500 including a road image 510, a change 520 in the gravitational acceleration before a predetermined period elapses from the captured time of the road image 510, and a map screen 540 is displayed on the subscriber terminal 50. When a play button 530a is operated on the browsing screen 500, a movie of three minutes (±90 seconds) around the captured time of the road image in which the abnormal region is detected, for example, is reproduced. It is possible to pause the movie when a pause button 530b is operated during the reproduction of the movie and to stop the reproduction of the movie when a stop button 530c is operated. By displaying the browsing screen 500, the road inspector can understand visually, numerically, and geographically the road surface that is highly likely to be worth a repair and the road surface that is highly likely to be worth inspecting on the next patrol. In the change 520 of the gravitational acceleration, an image of a predetermined time range around the reproduction time of the movie being displayed currently is displayed.

Processing Flow

Figure 12:
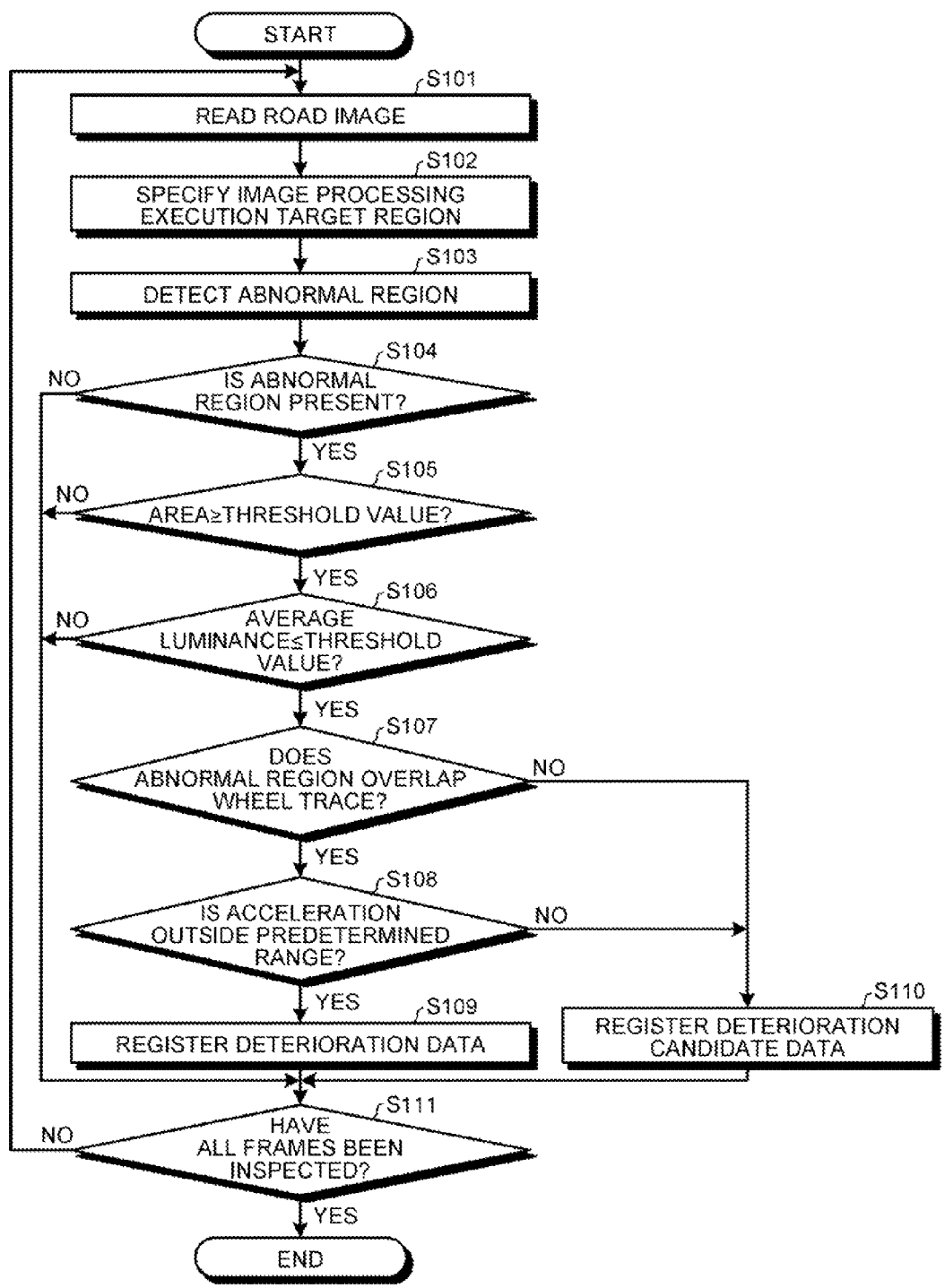
FIG. 12 is a flowchart illustrating the flow of a road surface inspection process according to the first embodiment.

Next, the flow of the processing of the road surface inspection device 10 according to this embodiment will be described. FIG. 12 is a flowchart illustrating the flow of a road surface inspection process according to the first embodiment. The road surface inspection process is started when new video data 13a is registered in the storage unit 13.

Figure 14:
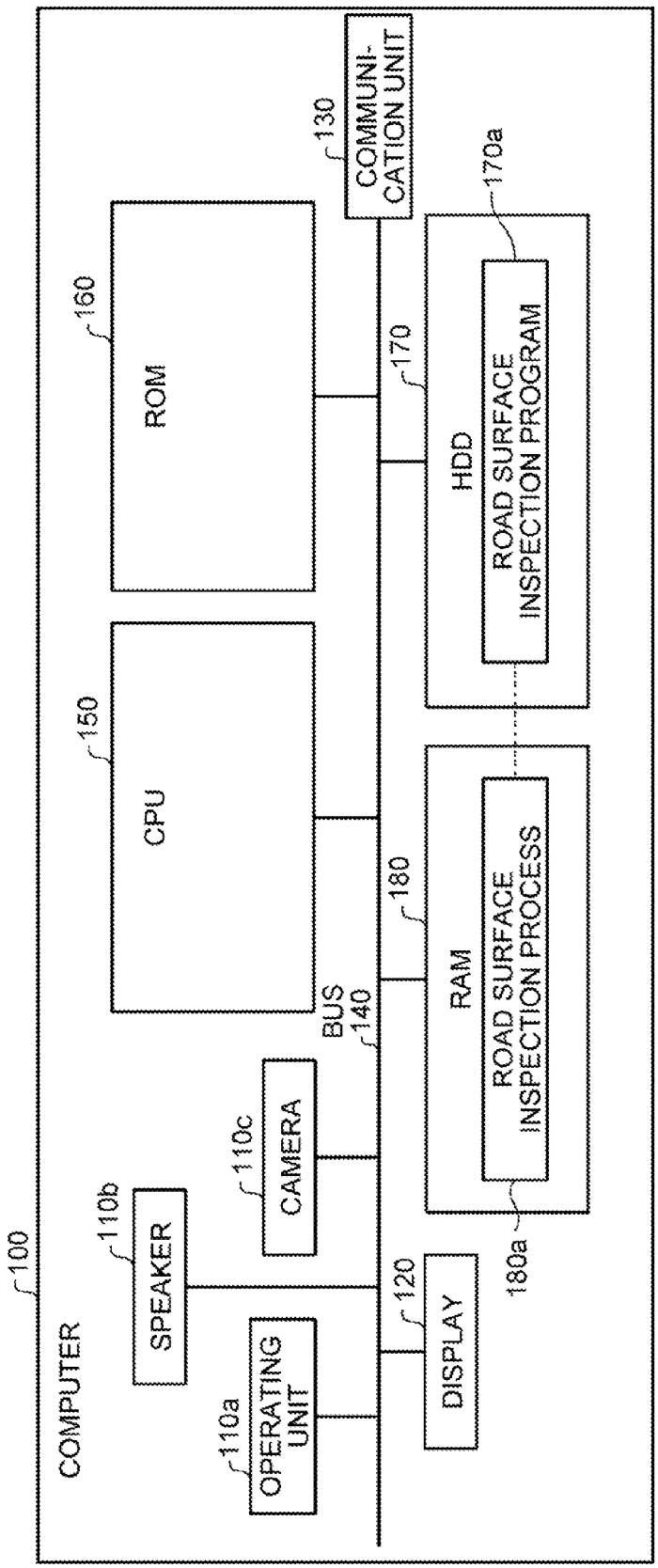
FIG. 14 is a diagram for describing an example of a computer that executes the road surface inspection program according to first and second embodiments.

As illustrated in FIG. 14, the abnormal region detecting unit 15b sequentially reads the frames of a road image included in the video data 13a stored in the storage unit 13 (step S101). Moreover, the abnormal region detecting unit 15b specifies the image processing execution target region E based on the vanishing point on the road image (step S102). After that, the abnormal region detecting unit 15b detects an abnormal region, in which it can be estimated that a discoloration or the like is present on the pavement of the road surface, from the specified image processing execution target region E (step S103).

When the abnormal region is present (Yes in step S104), the overlap determining unit 15c calculates the number of pixels that constitute the abnormal region, that is, the area of the abnormal region, and then determines whether the area of the abnormal region is equal to or greater than a predetermined threshold value $\Delta b$ (step S105).

In this case, when the abnormal region is not present (No in step S104), or when the area of the abnormal region is smaller than the predetermined threshold value Δb (No in step S105), it can be estimated that the abnormal region is less likely to be a bump, a groove, or a crack on the road surface. Thus, the flow proceeds to step S111 by skipping the subsequent processes of steps S106 to S110.

On the other hand, when the area of the abnormal region is equal to or greater than the predetermined threshold value Δb (Yes in step S105), it can be estimated that the abnormal region is highly likely to be a bump, a groove, or a crack on the road surface. Thus, the overlap determining unit 15c further determines whether an average value of the luminance of the pixels that constitute the abnormal region is equal to or smaller than a predetermined threshold value Δc (step S106).

When the average value of the luminance of the pixels that constitute the abnormal region is equal to or smaller than the predetermined threshold value Δc (Yes in step S106), the overlap determining unit 15c executes the following processes. That is, the overlap determining unit 15c further determines whether the abnormal region overlaps a trace along which the wheels of the patrol car 3 are expected to pass, defined by the wheel trace data 13c (step S107). When the average value of the luminance of the pixels that constitute the abnormal region exceeds the predetermined threshold value Δc (No in step S106), the flow proceeds to step S111 by skipping the subsequent processes of steps S106 to S110.

Subsequently, when the abnormal region overlaps the expected trace of the wheels (Yes in step S107), the acceleration determining unit 15d executes the following processes using the sensing data 13b. That is, the acceleration determining unit 15d determines whether an acceleration at the measurement time corresponding to the captured time of the road image is outside a predetermined range R (step S108).

Here, when the acceleration at the measurement time corresponding to the captured time of the road image is outside the predetermined range R (Yes in step S108), the generating unit 15e executes the following processes. That is, the generating unit 15e generates deterioration data for allowing the road inspector to check the necessity of repair and registers the deterioration data in the storage unit 13 (step S109).

On the other hand, when the abnormal region does not overlap the expected trace of the wheels (No in step S107), or when the acceleration at the measurement time corresponding to the captured time of the road image is not outside the predetermined range R (No in step S108), the generating unit 15e executes the following processes. That is, the generating unit 15e generates deterioration candidate data for prompting inspection on the next patrol of the patrol car 3 and registers the deterioration candidate data in the storage unit 13 (step S110).

After that, the road surface inspection device 10 executes the processes of steps S101 to S110 repeatedly until inspection of the road surface ends for all frames (No in step S111). Moreover, when the inspection of the road surface ends for all frames (Yes in step S111), the process ends.

Advantage of First Embodiment

As described above, in the road surface inspection device 10 according to this embodiment, it is possible to detect the deterioration of the road surface if at least the road image captured by the camera 31 and the gravitational acceleration measured by the G-sensor 32 are obtained. Therefore, in the road surface inspection device 10 according to this embodiment, a number of radar-based displacement meters or a number of cameras do not have to be provided in a vehicle such as a road surface state measurement vehicle, and a measurement control device for performing adaptive measurement with a radar-based displacement meter or a camera does not have to be provided in a vehicle. Thus, in the road surface inspection device 10 according to this embodiment, since it is possible to decrease the cost of the equipment of the patrol car 3 and simplify the configuration of the patrol car 3, it is possible to inspect the road surface frequently.

Therefore, according to the road surface inspection device 10 according to this embodiment, it is possible to detect the deterioration of the road surface at an early stage. In addition, in the road surface inspection device 10 according to this embodiment, since the deterioration of the road surface can be detected at an early stage, it is possible to decrease the cost for repairing the road.

[b] Second Embodiment

While an embodiment of the disclosed device has been described, this invention may be embodied in various other forms besides the above-described embodiment. Thus, in the following description, other embodiments included in this invention will be described.

Camera Attachment Position

For example, although the first embodiment illustrates a case where the camera 31 is attached to the front of the patrol car 3, the camera 31 may be attached to a predetermined position (for example, around the rear number plate) of the rear of the patrol car 3.

Figure 13:
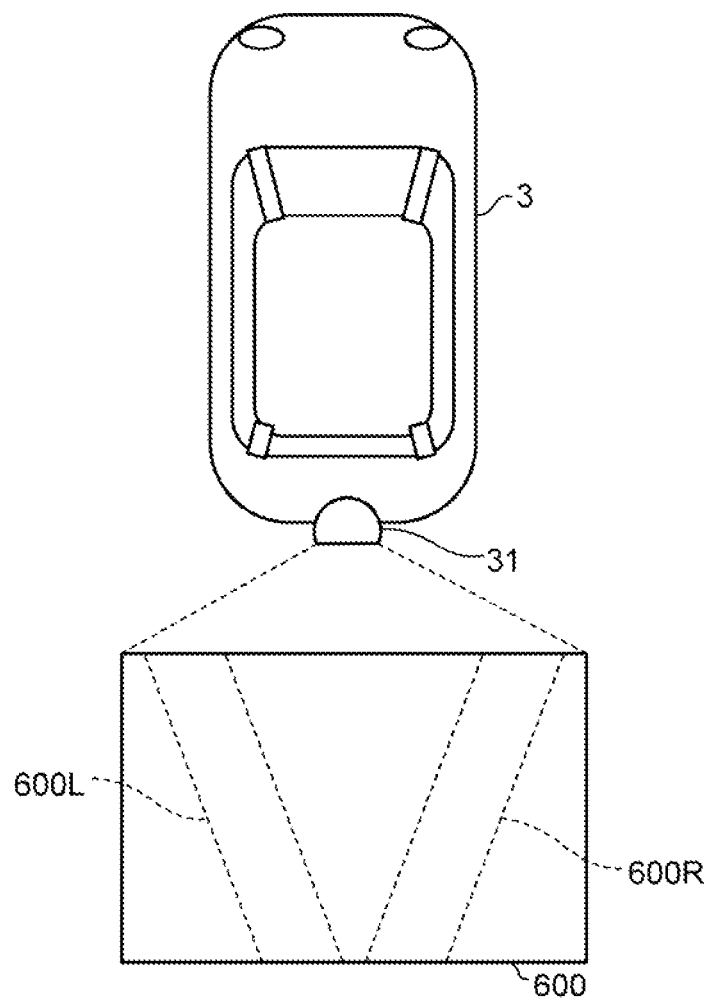
FIG. 13 is a diagram illustrating a modification example of the wheel trace data.

FIG. 13 is a diagram illustrating a modification example of the wheel trace data 13c. In the example of FIG. 13, a case where the camera 31 is attached to the rear of the patrol car 3 is considered. Reference numeral 600 illustrated in FIG. 13 represents a road image. Moreover, reference numerals 600L and 600R illustrated in FIG. 13 represent traces on the road image 600 along which the wheels of the patrol car 3 pass on the road surface. The wheel trace data 13c is set by calibrating the size and the position of a region on the road image, which the left and right wheels pass using the attachment angle of the camera 31 attached to the patrol car 3.

As illustrated in FIG. 13, the two regions of the trace 600L on the road image 600, along which the left wheel of the patrol car 3 passes on the road surface, and the trace 600R on the road image 600, along which the right wheel of the patrol car 3 passes on the road surface are defined as the wheel trace data 13c. As above, when the camera 31 is attached to the rear of the patrol car 3, the disclosed device can perform inspection of the road surface in a similar manner by determining whether the abnormal region overlaps the traces 600L and 600R.

Distribution and Integration

Moreover, the respective constituent components of the illustrated respective devices do not necessarily have such a physical configuration as illustrated in the drawings. That is, a specific distribution and integration form of the respective devices is not limited to the illustrated form, and all or part of the constituent components may be distributed and integrated functionally or physically in optional units according to various types of loads, a use state, or the like. For example, the registration unit 15a, the abnormal region detecting unit 15b, the overlap determining unit 15c, the acceleration determining unit 15d, the generating unit 15e, or the providing unit 15f may be connected via a network as an external device of the road surface inspection device 10. Moreover, the registration unit 15a, the abnormal region detecting unit 15b, the overlap determining unit 15c, the acceleration determining unit 15d, the generating unit 15e, or the providing unit 15f may be included in different devices, and the respective units may be connected via a network so as to realize the functions of the road surface inspection device 10 in cooperation.

Road Surface Inspection Program

The processes described in the embodiment can be realized by a computer, such as a personal computer or a workstation, executing programs provided in advance. In the following description, an example of a computer that executes a road surface inspection program having the same function as the above embodiment will be described with reference to FIG. 14.

FIG. 14 is a diagram for explaining an example of a computer that executes a road surface inspection program according to the first and second embodiments. As illustrated in FIG. 14, a computer 100 includes an operating unit 110a, a speaker 110b, a camera 110c, a display 120, and a communication unit 130. The computer 100 further includes a CPU 150, a ROM 160, a HDD 170, and a RAM 180. These respective units 110 to 180 are connected via a bus 140.

As illustrated in FIG. 14, a road surface inspection program 170a that performs the same functions as the registration unit 15a, the abnormal region detecting unit 15b, the overlap determining unit 15c, the acceleration determining unit 15d, the generating unit 15e, and the providing unit 15f described in the first embodiment is stored in advance in the HDD 170. The road surface inspection program 170a may be appropriately integrated or separated in a manner similarly to the respective constituent components of the registration unit 15a, the abnormal region detecting unit 15b, the overlap determining unit 15c, the acceleration determining unit 15d, the generating unit 15e, and the providing unit 15f illustrated in FIG. 3. That is, all of the respective items of the data stored in the HDD 170 does not have to be stored in the HDD 170, but only items of the data for the processing may be stored in the HDD 170.

The CPU 150 reads the road surface inspection program 170a from the HDD 170 and deploys the road surface inspection program 170a into the RAM 180. In this way, as illustrated in FIG. 14, the road surface inspection program 170a functions as a road surface inspection process 180a. The road surface inspection process 180a deploys various types of data read from the HDD 170 appropriately into a region allocated to the road surface inspection process 180a, on the RAM 180 and executes various processes based on the various types of deployed data. The road surface inspection process 180a includes the processes (for example, the processes illustrated in FIG. 12) executed by the registration unit 15a, the abnormal region detecting unit 15b, the overlap determining unit 15c, the acceleration determining unit 15d, the generating unit 15e, and the providing unit 15f illustrated in FIG. 3. Moreover, all of the respective processing units that are realized virtually on the CPU 150 do not have to be operated on the CPU 150, but only the processing units for processing may be realized virtually.

The road surface inspection program 170a does not have to be stored in the HDD 170 or the ROM 160 in advance. For example, the respective programs may be stored in a "portable physical medium" such as a flexible disk (so-called a FD), a CD-ROM, a DVD disc, a magneto-optical disc, or an IC card, inserted into the computer 100. Moreover, the computer 100 may acquire the respective programs from the portable physical medium and execute the programs. Moreover, the respective programs may be stores in other computers or server devices connected to the computer 100 via a public line, the Internet, a LAN, a WAN, or the like, and the computer 100 may acquire the respective programs from the computers or the server devices and execute the programs.

According to one aspect of the road surface inspection program disclosed herein, it is possible to detect the deterioration of the road surface at an early stage.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a road surface inspection process comprising:

detecting an abnormal region on a road surface from the road surface on an image stored in an image storage that stores therein an image in which a road surface of a road is captured by an imaging device mounted on a vehicle in association with a captured time of the image;

first determining whether the abnormal region overlaps a wheel trace stored in a trace storage that stores a trace on the image captured by the imaging device, along which wheels of the vehicle are expected to pass on the road surface, or a trace along which the wheels of the vehicle passes on the road surface; and when the abnormal region is determined to overlap the trace of the wheels, second determining whether an acceleration is outside a predetermined acceleration range, the acceleration being an acceleration at a measurement time corresponding to the captured time of the image in which the abnormal region overlaps the trace of the wheels among accelerations stored in an acceleration storage that stores therein an acceleration measured during driving on the road surface by an acceleration sensor mounted on the vehicle in association with the measurement time of the acceleration.

2. The non-transitory computer-readable recording medium according to claim 1, wherein the road surface inspection process further comprises, when the acceleration is determined to be outside the predetermined range, first registering an image in which at least the abnormal region overlaps the trace of the wheels in a deterioration information storage that stores information on deterioration of the road surface.

3. The non-transitory computer-readable recording medium according to claim 2, wherein the first registering includes registering an acceleration at the measurement time corresponding to the captured time of the image in the deterioration information storage in association with the image in which the abnormal region overlaps the trace of the wheels.

4. The non-transitory computer-readable recording medium according to claim 2, wherein the first registering includes registering a position of the vehicle at an acquisition time corresponding to the captured time of the image among positions stored in a position storage that stores therein the position acquired by a position acquiring device mounted on the vehicle in association with the acquisition time of the position, in the deterioration information storage in association with the image in which the abnormal region overlaps the trace of the wheels.

5. The non-transitory computer-readable recording medium according to claim 1, wherein the road surface inspection process further comprises, when the abnormal region is determined not to overlap the trace of the wheels, second registering an image in which at least the abnormal region is detected in a deterioration candidate information storage that stores information on a candidate of deterioration of the road surface.

6. A road surface inspection device comprising:
a memory; and
a processor coupled to the memory, wherein the processor executes a process comprising:
detecting an abnormal region on a road surface from the road surface on an image stored in an image storage that stores therein an image in which a road surface of a road is captured by an imaging device mounted on a vehicle in association with a captured time of the image;
first determining whether the abnormal region overlaps a wheel trace stored in a trace storage that stores a trace on the image captured by the imaging device, along which the wheels of the vehicle are expected to pass on the road surface, or a trace along which wheels of the vehicle passes on the road surface; and
when the abnormal region is determined to overlap the trace of the wheels, second determining whether an acceleration is outside a predetermined acceleration range, the acceleration being an acceleration at a measurement time corresponding to the captured time of the image in which the abnormal region overlaps the trace of the wheels among accelerations stored in an acceleration storage that stores therein an acceleration measured during driving on the road surface by an acceleration sensor mounted on the vehicle in association with the measurement time of the acceleration.

7. A road surface inspection method comprising:
detecting, using a processor, an abnormal region on a road surface from the road surface on an image stored in an image storage that stores therein an image in which a road surface of a road is captured by an imaging device mounted on a vehicle in association with a captured time of the image;
first determining, using the processor, whether the abnormal region overlaps a wheel trace stored in a trace storage that stores a trace on the image captured by the imaging device, along which wheels of the vehicle are expected to pass on the road surface, or a trace along which the wheels of the vehicle passes on the road surface; and
when the abnormal region is determined to overlap the trace of the wheels, second determining, using the processor, whether an acceleration is outside a predetermined acceleration range, the acceleration being an acceleration at a measurement time corresponding to the captured time of the image in which the abnormal region overlaps the trace of the wheels among accelerations stored in an acceleration storage that stores therein an acceleration measured during driving on the road surface by an acceleration sensor mounted on the vehicle in association with the measurement time of the acceleration.

* * * * *